L. LEDERMANN.
PROCESS IN THE MANUFACTURE OF HOLLOW SAFETY BELTS.
APPLICATION FILED JUNE 11, 1908.

996,097.

Patented June 27, 1911.
2 SHEETS—SHEET 1.

WITNESSES
W. P. Burke
W. J. Smith

INVENTOR
Leo Ledermann

L. LEDERMANN.
PROCESS IN THE MANUFACTURE OF HOLLOW SAFETY BELTS.
APPLICATION FILED JUNE 11, 1908.

996,097.

Patented June 27, 1911.

2 SHEETS—SHEET 2.

WITNESSES

INVENTOR

UNITED STATES PATENT OFFICE.

LEO LEDERMANN, OF BERLIN, GERMANY.

PROCESS IN THE MANUFACTURE OF HOLLOW SAFETY-BELTS.

996,097.

Specification of Letters Patent.  Patented June 27, 1911.

Application filed June 11, 1908. Serial No. 437,950.

*To all whom it may concern:*

Be it known that I, LEO LEDERMANN, manufacturer, residing at 38 Allensteinerstrasse, Berlin, Germany, have invented new and useful Improvements in Processes in the Manufacture of Hollow Safety-Belts, of which the following is a specification.

The present invention relates to the application of a new process in the manufacture of hollow safety belts divided into compartments by the insertion of partitions into the interior of the body.

Hollow safety belts divided into compartments by means of partitions are already known and were hitherto made in sections, each part being stamped and bent separately, the dividing partitions inserted and the whole then fitted together. A belt of equal proportions was to be obtained by this process only by the most careful workmanship. In the process hereindescribed, the construction of such safety belts is considerably simplified. A hollow ring of sheet metal is first made, cut into segments, into the open ends of each of which partitions are soldered and the whole then joined up again to a closed ring, the breaks being joined by soldering or in some other manner.

This process may be equally advantageously applied to the manufacture of open, *i. e.* U shaped, or horse shoe belts. In the latter case the body of the belt is formed by a semi-circular hollow ring, the ends of which run out into straight continuations. These must be of such length that their cubical contents is together equal to the cubical content of the semicircular part in order that the buoyancy of the separate sections may be equal in every radius drawn from the center of the ring, under which conditions an open belt is just as "stiff" as one which is completely closed.

Figure 1:
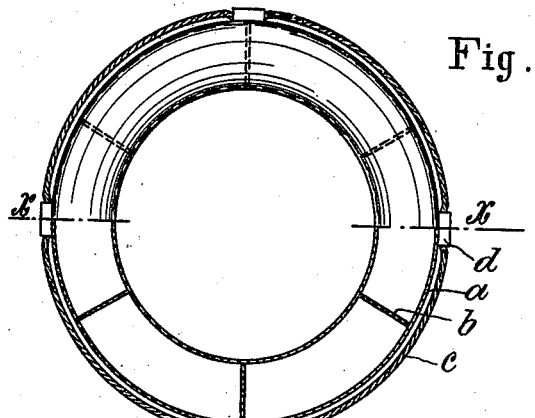
Figure 2:
Figure 3:
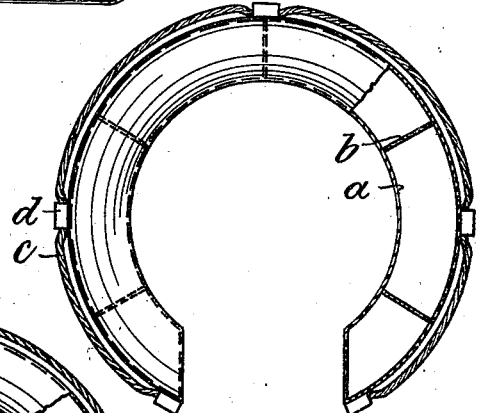
Figure 4:
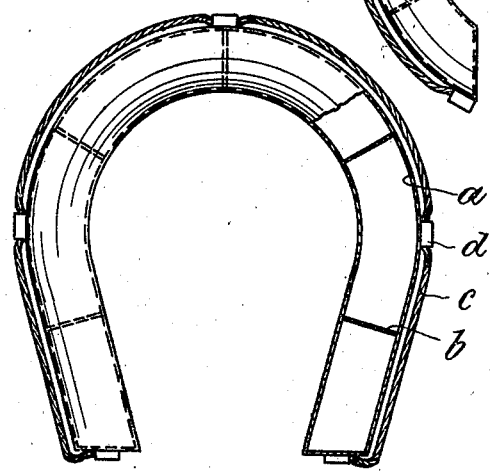
Figure 5:
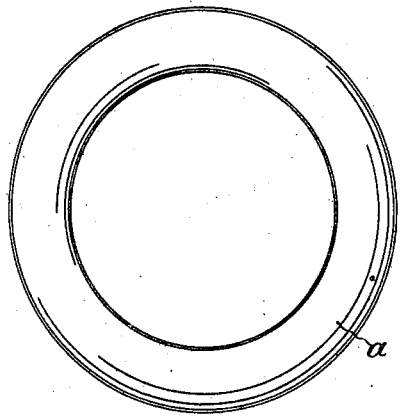
Figure 6:
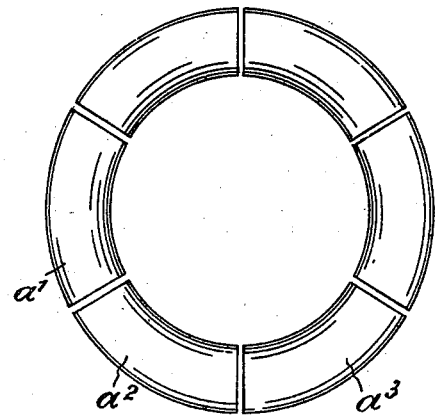
Figure 7:
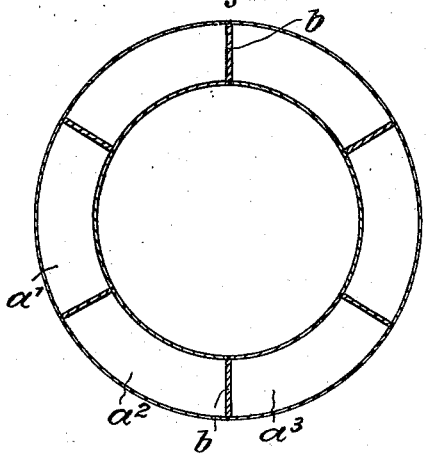
Figure 8:
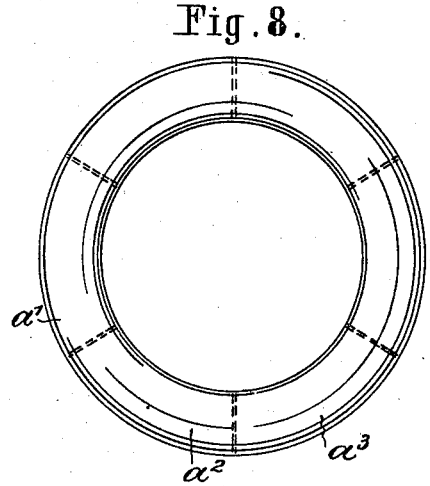

A safety belt made by the process described is shown in the following drawings. Figure 1 shows the belt from above. Fig. 2 is a section on the line $x, x,$ in Fig. 1. Figs. 3 and 4 show an open safety belt in two forms of construction. Fig. 5 shows a ring before being cut. Fig. 6 shows a ring after being cut into sections. Fig. 7 is a sectional view with the ring put together again and showing the partitions therein. Fig. 8 is a view of the completed ring.

In the drawings $a$, denotes the sheet metal frame-ring, $b$ the interior partitions separating the various compartments, $d$ the eyelet holes through which the line $c$ is passed, such as safety belts are usually provided with.

The ring is manufactured in the following manner:—The tin-ring is first cut into several ring-sections, for instance six, ($a^1, a^2, a^3$, Fig. 6). These ring-sections are again subsequently joined with each other by means of partition walls $b$. The edges of these partitions are soldered to the walls of the ring-sections. Thus there is formed a complete ring according to Fig. 8, said ring having the advantage of being absolutely round and that the parts of the same require no further working.

What I claim and desire to secure by Letters Patent is:—

1. A process for the manufacture of safety belts consisting in first forming a cylindrical closed body, then dividing the body into sections, then placing partitions in the ends of said sections and reassembling the sections and securing the abutting ends of the sections to each other and to the edges of the partitions.

2. A process for the manufacture of safety belts, consisting in first forming a hollow annular body, then dividing said body into a plurality of sections, then inserting partitions in the ends of said sections and finally reassembling the sections and securing the abutting ends of adjacent sections together and to the edges of the interposed portions whereby an annular body containing a plurality of closed chambers is formed.

In testimony whereof I have signed my name to this specification in the presence of two subscribing witnesses.

LEO LEDERMANN.

Witnesses:
HENRY HASPER,
WOLDEMAR HAUPT.

Copies of this patent may be obtained for five cents each, by addressing the "Commissioner of Patents, Washington, D. C."